United States Patent
Shimamura et al.

(10) Patent No.: US 8,262,520 B2
(45) Date of Patent: Sep. 11, 2012

(54) PULLEY ASSEMBLY FOR A POWER TRANSMISSION BELT

(75) Inventors: Hayato Shimamura, Hyogo (JP); Chikara Kayamuro, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 828 days.

(21) Appl. No.: 12/215,292

(22) Filed: Jun. 26, 2008

(65) Prior Publication Data

US 2009/0005201 A1  Jan. 1, 2009

(30) Foreign Application Priority Data

Jun. 26, 2007  (JP) ................. 2007-167362

(51) Int. Cl.
 *F16D 3/00* (2006.01)
 *F16D 3/28* (2006.01)
 *F16D 3/70* (2006.01)

(52) U.S. Cl. ............... 474/94; 464/71; 464/89; 464/90

(58) Field of Classification Search ............... 474/94; 464/89–91; 74/574.2, 574.4
 See application file for complete search history.

(56) References Cited

U.S. PATENT DOCUMENTS

| | | | | |
|---|---|---|---|---|
| 447,447 A * | 3/1891 | Daily | ................ | 476/1 |
| 1,126,031 A * | 1/1915 | Kirchner | ................ | 152/96 |
| 1,793,888 A * | 2/1931 | Whitehouse | ................ | 464/91 |
| 1,894,432 A * | 1/1933 | Watson | ................ | 254/327 |
| 2,084,761 A * | 6/1937 | Bradley | ................ | 464/91 |
| 2,126,705 A * | 8/1938 | Schmidt | ................ | 464/90 |
| 2,196,923 A * | 4/1940 | Johanson | ................ | 474/94 |
| 2,247,163 A * | 6/1941 | Bradley | ................ | 464/91 |
| 2,251,804 A * | 8/1941 | Reuter et al. | ................ | 464/91 |
| 2,329,901 A * | 9/1943 | Herrington | ................ | 152/47 |
| 2,388,186 A * | 10/1945 | Rowsey | ................ | 464/33 |
| 2,594,555 A * | 4/1952 | Hardy | ................ | 74/574.4 |
| 2,596,501 A * | 5/1952 | Montgomery | ................ | 464/83 |
| 2,622,419 A * | 12/1952 | McIntyre | ................ | 464/71 |
| 2,637,986 A * | 5/1953 | Iredell, Jr. | ................ | 464/91 |
| 2,674,897 A * | 4/1954 | Heinish | ................ | 474/94 |
| 2,879,873 A * | 3/1959 | Spase | ................ | 192/104 C |
| 2,882,747 A * | 4/1959 | Haushalter | ................ | 74/574.4 |
| 2,898,142 A * | 8/1959 | Kordes | ................ | 295/11 |
| 2,921,449 A * | 1/1960 | Jackel | ................ | 464/90 |
| 2,999,374 A * | 9/1961 | Kleinschmidt | ................ | 464/91 |
| 3,013,828 A * | 12/1961 | Kleinschmidt | ................ | 403/133 |
| 3,054,276 A * | 9/1962 | Kleinschmidt | ................ | 464/91 |
| 3,216,267 A * | 11/1965 | Dolza | ................ | 474/94 |
| 3,377,875 A * | 4/1968 | Sand | ................ | 474/94 |
| 3,479,907 A * | 11/1969 | Hall | ................ | 74/574.4 |

(Continued)

*Primary Examiner* — Michael Mansen
*Assistant Examiner* — Henry Liu
(74) *Attorney, Agent, or Firm* — Wood, Phillips, Katz, Clark & Motimer (57) ABSTRACT

A pulley assembly has a first body to engage a power transmission belt. The first body is rotatable around a first axis. A second body is movable relative to the first body around the first axis. First and second axially spaced elastic members each has a radially inner portion and a radially outer portion. One of: (a) the radially inner portions of the first and second members; and (b) the radially outer portions of the first and second members are: (i) coupled to move together around the first axis; and (ii) each movable relative to the first and second bodies around the first axis. The other of: (a) the radially inner portions of the first and second members; and (b) the radially outer portions of the first and second members are fixedly coupled, one each to the first and second bodies, to follow movement of the first and second bodies around the first axis.

25 Claims, 5 Drawing Sheets

U.S. PATENT DOCUMENTS

| | | | | |
|---|---|---|---|---|
| 3,524,359 A * | 8/1970 | Buchwald | | 474/94 |
| 3,817,056 A * | 6/1974 | Crankshaw | | 464/89 |
| 3,945,269 A * | 3/1976 | Bremer, Jr. | | 74/574.4 |
| 4,002,081 A * | 1/1977 | Schultz, Jr. | | 474/94 |
| 4,041,803 A * | 8/1977 | Goloff et al. | | 74/574.4 |
| 4,047,445 A * | 9/1977 | Anderson | | 474/94 |
| 4,080,008 A * | 3/1978 | Groff et al. | | 305/199 |
| 4,307,627 A * | 12/1981 | Sullivan | | 74/574.4 |
| 4,328,879 A * | 5/1982 | Tone | | 180/219 |
| 4,486,183 A * | 12/1984 | Posiviata et al. | | 474/94 |
| 4,779,483 A * | 10/1988 | Andra et al. | | 74/574.2 |
| 4,781,659 A * | 11/1988 | Gebhardt | | 474/94 |
| 5,215,502 A * | 6/1993 | Neathery et al. | | 464/71 |
| 5,308,289 A * | 5/1994 | Funahashi | | 474/94 |
| 5,562,544 A * | 10/1996 | Ochs et al. | | 464/89 |
| 5,573,461 A * | 11/1996 | Colford | | 464/83 |
| 5,637,041 A * | 6/1997 | Hamaekers et al. | | 464/90 |
| 5,791,695 A * | 8/1998 | Snider | | 285/148.23 |
| RE35,932 E * | 10/1998 | Cerny et al. | | 474/135 |
| 5,988,015 A * | 11/1999 | Riu | | 74/574.2 |
| 6,026,709 A * | 2/2000 | Depp et al. | | 74/573.12 |
| 6,106,421 A * | 8/2000 | Graber et al. | | 474/94 |
| 6,217,453 B1 * | 4/2001 | Thompson | | 464/89 |
| 6,325,723 B1 * | 12/2001 | David | | 464/96 |
| 6,332,842 B1 * | 12/2001 | Tabuchi et al. | | 464/33 |
| 6,494,799 B1 * | 12/2002 | Ochiai | | 474/94 |
| 6,702,681 B1 * | 3/2004 | Ochs | | 464/90 |
| 7,048,661 B2 * | 5/2006 | Shibata et al. | | 474/94 |
| 7,121,947 B2 * | 10/2006 | Ueda et al. | | 464/10 |
| 7,150,679 B2 * | 12/2006 | Pape et al. | | 464/17 |
| 7,204,772 B2 * | 4/2007 | Huber | | 474/94 |
| 7,300,372 B2 * | 11/2007 | Riu | | 474/94 |
| 7,850,557 B2 * | 12/2010 | Moriya et al. | | 474/94 |
| 2006/0172832 A1 * | 8/2006 | Watanabe et al. | | 474/94 |

* cited by examiner

PULLEY ASSEMBLY FOR A POWER TRANSMISSION BELT

BACKGROUND OF THE INVENTION

1. Field of the Invention

This invention relates to pulley assemblies and, more particularly, to a pulley assembly, such as one that would be used on an auxiliary apparatus on an engine, that is driven by a power transmission belt.

2. Background Art

In a typical automobile engine construction, multiple auxiliary apparatus are incorporated, each with a shaft that is rotated to effect operation thereof. Typical of such auxiliary apparatus are alternators, air compressors, water pumps, etc. Each apparatus has an associated pulley, as does a drive shaft on the engine, about which an endless belt is trained in a serpentine manner. The engine drive shaft develops an operating torque that is transmitted through the belt to the various auxiliary apparatus through the pulleys thereon.

Since the output shaft on the engine undergoes rotational speed changes, due to a number of factors, such as during expansion strokes, the resulting speed of the belt travel likewise changes. These speed changes may cause slippage between the belt and the various pulleys on the auxiliary apparatus. The speed fluctuations may also cause significant variations in the belt tension.

Both the slip and speed variation conditions have adverse consequences. One problem is that there may be generation of excessive noise during running. These conditions may also shorten the life of the belt and/or the auxiliary apparatus. Other problems may also result.

The above problems are particularly troublesome with an alternator. Alternators have shafts that typically have a high moment of inertia. This may aggravate both the slip and tension variation conditions. Still further, variations in speed of the output shaft translate into corresponding speed variations in the alternator shaft. This may cause a failure of the alternator or reduce its useful life. The result is potentially a detrimental effect on power generation efficiency.

The above problems have been known in the industry. Attempts have been made to devise structures that would avoid these conditions and associated problems. In Japanese Patent Laid-Open Publication No. 2006-177548, a pulley assembly is disclosed with a rim having a cylindrical surface against which a belt is run, a center hub installed inside the rim, a rubber elastic ring disposed between the rim and the center hub, and a rotation restricting unit. The rotation restricting unit consists of a central plate that is square in shape and fixed to an outer circumferential surface of the center hub. Elastic contact parts are disposed on an inner circumferential surface of the rim at regular intervals. As the rim rotates relative to the center hub, the rubber ring is twisted so that slippage or variation in tension of the belt can be limited. Relative rotation between the parts is also limited by contact between the elastic parts and the central plate when a predetermined degree of rotation occurs between these components.

If the rubber ring is twisted repeatedly within the permitted range of relative movement of the parts, the rubber ring may be prone to failure within a relatively short time period.

In Japanese Patent Laid-Open Publication No. Hei 6-200956 a pulley assembly is disclosed with an outer ring against which a belt is wrapped, an inner ring inside the outer ring, and a spring body formed from an elastomer material and disposed between the outer ring and the inner ring. The spring body is attached to one of the inner ring and outer ring so as to be fixed against relative rotation with respect thereto. The spring body is slidably connected through a sliding layer to the other ring. When the inner ring and outer ring rotate relative to each other, the spring is twisted, thereby to prevent slippage or variations in tension. Additionally, a frictional force is generated between the sliding layer and ring, to prevent excessive twisting of the spring body.

Even though the sliding layer is provided between the spring body and ring, it is still possible that the spring body could be extensively twisted when there is erratic, and large magnitude, change in engine speed. This increases the likelihood that the spring body will break, potentially within a relatively short time period.

SUMMARY OF THE INVENTION

In one form of the invention, a pulley assembly has a first body with a cylindrically-shaped surface to engage a power transmission belt. The first body is rotatable around a first axis. A second body in axially overlapping relationship with the first body is movable relative to the first body around the first axis. A plurality of elastic members, including at least first and second axially spaced elastic members, extend at least partially around the first axis. The first and second elastic members each has a radially inner portion and a radially outer portion. One of: (a) the radially inner portions of the first and second elastic members; and (b) the radially outer portions of the first and second elastic members are: (i) coupled to move together around the first axis; and (ii) each movable relative to the first and second bodies around the first axis. The other of: (a) the radially inner portions of the first and second elastic members; and (b) the radially outer portions of the first and second elastic members are fixedly coupled, one each to the first and second bodies, so as to follow movement of the first and second bodies around the first axis.

In one form, the first and second bodies define a space bounded by radially oppositely facing surfaces within which the first and second elastic members reside.

In one form, the first and second elastic members are each annular in shape.

In one form, the first and second elastic members are made from rubber.

In one form, at least part of the second body resides radially within the first body.

In one form, the second body has radially inner and outer axially overlapping cylindrical sections, each with an axial extent. The radially outer section has a shorter axial extent than the radially inner section. The space is made up of a first subspace and a second subspace. The first subspace is bounded by a radially inwardly facing surface on the first body and a radially outwardly facing surface on the radially inner section. The second subspace is bounded by a radially inwardly facing surface on the radially outer section and a radially outwardly facing surface on the radially inner section. The first and second elastic members reside respectively in the first and second subspaces. The radially inner portions of the first and second elastic members are coupled to move together around the first axis. The radially outer portion of the first elastic member is fixedly coupled to the radially inwardly facing surface on the first body. The radial outer portion of the second elastic member is fixedly coupled to the radially inwardly facing surface on the radially outer section.

In one form, the one of: (a) the radially inner portions of the first and second elastic members; and (b) the radially outer portions of the first and second elastic members are slidably attached to one of the first and second bodies.

In one form, the one of: (a) the radially inner portions of the first and second elastic members; and (b) the radially outer portions of the first and second elastic members are slidably attached to the first body.

In one form, at least one of the elastic members is installed to be in a radially compressed, or a radially extended, state.

In one form, there is a first shoulder on the first body and a second shoulder on the second body. The first and second shoulders abut to block relative movement of the first and second bodies around the first axis.

In one form, there is a circumferentially extending slot in one of the first and second bodies bounded by one of the first and second shoulders and there is a protrusion on the other of the first and second bodies that extends into the slot and defines the other of the first and second shoulders.

In one form, the pulley assembly further includes a friction member that contacts the first and second bodies and generates a frictional force between the first and second bodies.

In one form, the pulley assembly is provided in combination with: an engine having an output shaft and a first pulley mounted to the output shaft; a plurality of auxiliary apparatus, including an alternator and at least one other auxiliary apparatus, each auxiliary apparatus having a shaft, the alternator having a shaft with the pulley assembly thereon, the at least one other auxiliary apparatus having a pulley on its associated shaft; and a belt trained around the first pulley, the pulley assembly and the pulley on the at least one other auxiliary apparatus.

DETAILED DESCRIPTION OF THE PREFERRED EMBODIMENT

Figure 1:
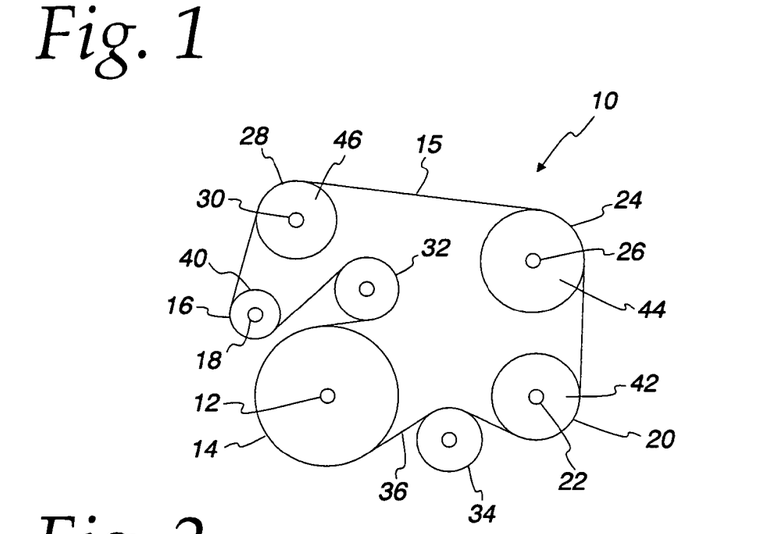
FIG. 1 is a schematic representation of an engine system with an engine output/crank shaft that drives a plurality of auxiliary apparatus through a power transmission belt, each of which apparatus may incorporate a pulley assembly according to the present invention.

An engine system, that serves as an exemplary environment for the present invention, is shown at 10 in FIG. 1. The engine on the engine system 10 has an output/crank shaft 12 with a pulley 14 mounted thereon. A plurality of auxiliary apparatus are provided, each with a shaft that is driven by the output/crank shaft 12 through an endless power transmission belt 15.

More particularly, the auxiliary apparatus include: an alternator 16 with a shaft 18; an air compressor 20 with a shaft 22; a power steering unit 24 with a shaft 26; and a water pump 28 with a shaft 30. The engine system 10 further incorporates an automatic tensioner 32 for the belt 15 and an idler 34 pressed against a back side 36 of the belt 15. The belt 15 is trained in a serpentine path around the output/crank shaft pulley 14 as well as pulley assemblies 40,42,44,46, respectively carried by the shafts on the alternator 16, the air compressor 20, the power steering unit 24, and the water pump 28.

Figure 2:
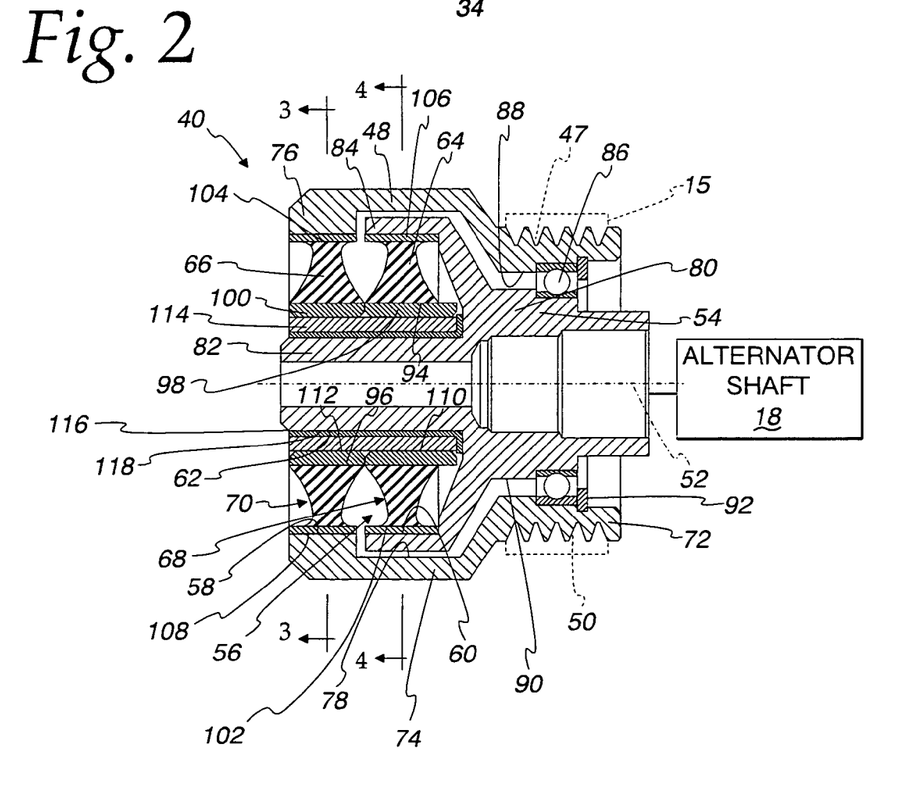
FIG. 2 is a fragmentary, cross-sectional view of one specific form of pulley assembly, according to the invention.

The belt 15 is typically a V-ribbed belt, as shown in FIG. 2, with a plurality of laterally spaced, V-shaped ribs 47 extending lengthwise of the belt 15. As the engine system 10 is operated, the output/crank shaft 12 produces a torque that is transmitted from the pulley 14 through the belt 15 to each of the pulley assemblies 40,42,44,46, to thereby drive and operate the associated auxiliary apparatus 16,20,24,28, respectively.

The pulley assembly 40 on the alternator 16 will be described in detail, initially with respect to FIG. 2. The pulley assembly 40 has a first body 48 with a cylindrically-shaped surface 50 to engage the power transmission belt 15. The surface 50 has a ribbed shape that is complementary to the ribbed shape of the belt 15. The first body 48 is rotatable around a first axis 52.

A second body 54 is in axially overlapping relationship with the first body 48. The second body 54 is movable relative to the first body 48 around the first axis 52. In this embodiment, the second body 54 is radially inside of the first body 48.

The first and second bodies 48,54 define a space 56 bounded cooperatively by radially oppositely facing surfaces on the first and second bodies 48,54 and, more particularly, radially inwardly facing surfaces 58,60 on the first body 48 and second body 54, respectively, and a radially outwardly facing surface 62 on the second body 54.

A plurality of elastic members, and in this case first and second axially spaced, elastic members 64,66, respectively, are provided respectively in first and second subspaces 68,70, that together make up the space 56. The elastic members do not overlap each other axially and have substantially the same axial extent.

The first body 48 has an overall cylindrical shape with a pulley section 72 on which the surface 47 is defined, a center section 74, having an outside diameter greater than that of the pulley section 72, and an end section 76 with a thicker radial dimension than that of the center section 74, whereby the diameter of the radially inwardly facing surface 58 on the end section 76 is less than the diameter of the radially inwardly facing surface 78 on the center section 74. The sections 72,74, 76 are formed as one piece, although this is not a requirement.

The second body 54 has a main section 80 that branches into radially inner and outer, axially overlapping, cylindrical sections 82,84, respectively, each with an axial extent. The outer section 84 has a shorter axial extent than the inner section 82. The outer section 84 axially coincides with the center section 74 of the first body 48 and is seated relative thereto so that the radially inwardly facing surface 60 thereon has a diameter that is substantially equal to the diameter of the radially inwardly facing surface 58 on the first body 48.

A ring-shaped roller bearing 86 is placed between a radially inwardly facing surface 88 on the pulley section 72 on the first body 48 and a radially outwardly facing surface 90 on the main section 80 of the second body 54. Both bodies 48,54 are undercut in a radial direction to seat, and confine axial shifting of, the roller bearing 86 from right to left in FIG. 2. A snap ring 92 is installed to prevent left to right axial shifting of the roller bearing 86.

The second body 54 is joined to the alternator shaft 18 to rotate therewith. This may be effected through a threaded connection or any other suitable connecting structure.

The elastic members 64,66 are shown to be annular in shape, with an identical configuration, though this is not a requirement. The elastic members 64, 66 diminish progressively in axial thickness in a radially outward direction toward a radially outer end that is slightly thickened. The elastic members 64, 66 are preferably made from rubber. Suitable rubbers for the elastic members 64,66 are: ethylene propylene diene copolymer (EPDM) rubber; natural rubber (NR); chloroprene rubber (CR); and butyl rubber (BR). Urethanes and other materials may be used.

Radially inwardly facing surfaces 94,96 on the first and second elastic members 64,66 are substantially concentric and are fixed to inner rings 98,100, respectively. The rings 98,100 are preferably made from a metallic material.

The radially outwardly facing surfaces 102,104 on the elastic members 64,66, are substantially concentric and fixed to outer rings 106,108. The outer rings 106,108 are likewise preferably formed from a metallic material. In a no-load condition, with no external forces applied, the inside diameters of the elastic members 64,66 are substantially equal to the outside diameters of the inner rings 98,100. At the same time, the outside diameters of the elastic members 64,66 are slightly greater than the inside diameters of the outer rings 106,108. Accordingly, the elastic members 64,66 reside in the subspaces 68,70 in a radially compressed condition. The elastic members 64,66 are preferably the same in terms of their compressibility, which is determined based upon their particular shape and the materials defining the members 64,66.

The radially inwardly facing surfaces 94,96 on the elastic members 64,66 may be fixed to the inner rings 98,100 through vulcanization bonding, in the event the elastic members 64,66 are made from rubber. In the event the elastic members 64,66 are made from urethane, the connection may be effected through chemical bonding by means of an adhesive. The radially outwardly facing surfaces 102,104 of the elastic members 64,66 are preferably bonded to the outer rings 106, 108 through chemical bonding utilizing an adhesive.

The outer ring 106, bonded to the elastic member 64 in the first subspace 68, is fixed to the radially inwardly facing surface 60 on the outer section 84 of the second body 54. The outer ring 108, bonded to the elastic member 66 in the second subspace 70, is fixed to the radially inwardly facing surface 58 on the end section 76 of the first body 48. Through this arrangement, radially outer portions of the first and second elastic members 64,66 are fixedly coupled to follow movement of the second and first bodies 54,48, respectively.

Radially inwardly facing surfaces 110,112 on the inner rings 98,100 are fixed to an inside ring 114 that spans the axial extent of the inner rings 98,100. The inside ring 114 is preferably made from a metallic material. By fixing the inner rings 98,100 to the inside ring 114, radially inner portions of the elastic members 64,66 are coupled to move together around the first axis 52.

A cylindrical slide bearing 116 is interposed between the inside ring 114 and a radially outwardly facing surface 118 on the inner section 82 of the second body 54. The inside ring 114 is fixed to the slide bearing 116. Accordingly, the inside ring 114 is permitted to smoothly rotate, with low frictional resistance, relative to the second body 54. Thus, the radially inner portions of the elastic members 64,66 are each movable relative to the bodies 48,54. More specifically, the radially inner portions of the elastic members 64,66 are rotatable relative to the inner section 82 of the second body 54, while being slidably mounted on the inner section 82 through the inner rings 98,100 and the coupling inside ring 114. Through this arrangement, the members 64,66 are stably supported in the space 56 while radially inner portions thereof are guided smoothly in rotation relative to both bodies 48,54 around the axis 52.

The performance of the elastic members 64,66 will now be explained at the point locations whereat the bodies 48,54 are rotated relative to each other. This analysis will be made with respect to FIGS. 3 and 4 with circumferential segments of the members 64,66.

Figure 3:
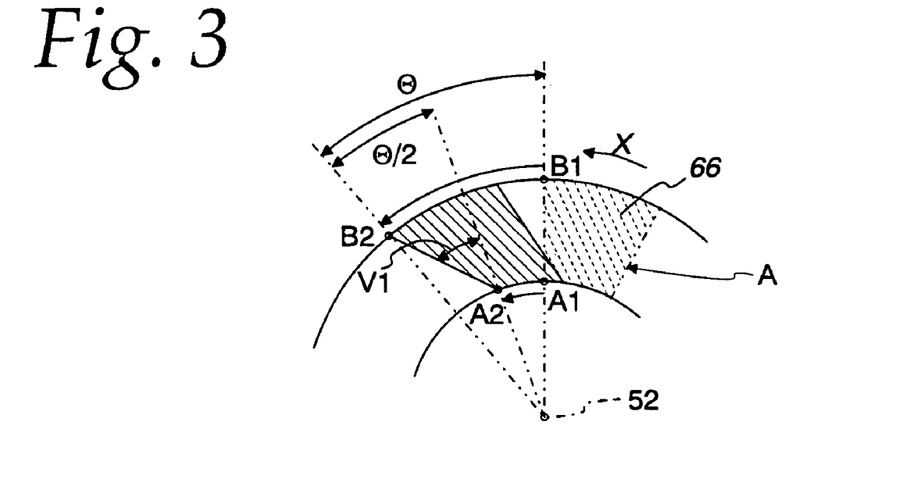
FIG. 3 is a fragmentary view of an elastic member on the pulley assembly, taken along line 3-3 of FIG. 2, and showing shearing deformation thereof.

In FIG. 3, a segment of the elastic member 66 is shown at A with their being no torsion load. A point on a radially inner side of the segment A is shown at A1, with a corresponding radially outer point shown at B1.

Figure 4:
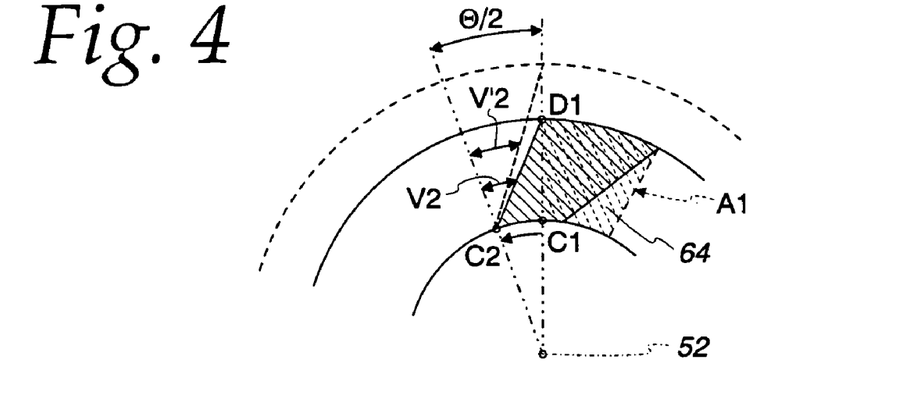
FIG. 4 is a view as in FIG. 3 of another elastic member, taken along line 4-4 of FIG. 2.

As shown in FIG. 4, a corresponding segment of the elastic member 64 is shown at A1 under a no torsion load condition. A point on a radially inner side of the elastic member 64 is shown at C1, with a radially outer point shown at D1.

The first body 48 rotates through an angle $\theta$ relative to the second body 54 in the direction indicated by the arrow X in FIG. 3. Since the radially outer portion of the section A is fixed to the body 48, with a rotational movement of the body 48 through an angle $\theta$ in the direction of the arrow X, the point B1 moves correspondingly to point B2 in FIG. 3. Since the radially outer portion of the elastic member 64 is fixed to the body 54 and is not shifted, the point D1 does not move. Additionally, since the radially inner portions of the elastic members 64,66 are coupled together, the points A1 and C1 move through the same angle.

As shown in FIGS. 3 and 4, the radially inner portions of the members 64,66 are shifted through an angle $\theta/2$ in the direction of arrow X, with the points A1 and C1 respectively moved to points A2 and C2. The elastic member 66 deforms, as the radially outer portion thereof is shifted in shear relative to the radially inner portion, through an angle $\theta/2$ in the direction of the arrow X around the axis 52. The elastic member 64/deforms, as the radially outer portion thereof is shifted in shear relative to the radially inner portion, through an angle $\theta/2$ in a direction opposite to the direction of the arrow X around the axis 52.

Accordingly, when the bodies 48,54 rotate relative to each other, the elastic members 64,66 are deformed in shear in opposite directions. Accordingly, variations in rotation of the bodies 48,54 can be accommodated, thereby preventing slippage or significant variations in belt tension at the pulley section 72 of the body 48.

The rotational angle of displacement between the radially inwardly facing surfaces and the radially outwardly facing surfaces on the elastic members 64,66 around the axis 52 is defined as a torsion angle. As shown in FIGS. 3 and 4, when the angle of relative movement between the bodies 48,54 around the axis 52 is taken as $\theta$, each torsion angle for the elastic members 64,66 is $\theta/2$.

In the prior art, it is known to make pulley assemblies with cylindrically-shaped bodies that rotate, one relative to the other. A rubber elastic member is provided radially between the members and has radially inwardly and radially outwardly facing surfaces that are fixed, one each, to the two bodies. With this arrangement, the torsion angle of the elastic member is equal to the angle of relative rotation between the bodies.

On the other hand, with the inventive structure, the torsion angle for each of the elastic members 64,66 is equal to only one half of the angular range of movement between the bodies

48,54 around the axis 52. Therefore the torsion angle for each of the elastic members 64,66 is one half the torsion angle for a single elastic member conventionally constructed, as described above. Since the degree of shear deformation/strain for the elastic members 64,66 is smaller than with conventional structures, it can be expected that these members 64,66 will have a longer useful life.

As also seen in FIGS. 3 and 4, the angles of displacement between the radially outwardly facing surfaces and the radially inwardly facing surfaces of the elastic members 64,66 are defined as shear deformation angles V1 and V2, for the elastic members 64,66, respectively. As shown in FIG. 4, when the inside diameter of the elastic member 64 and a torsion angle are assumed to be unchanged, as the outside diameter of the elastic member 64 increases, the shear deformation angle V'2 decreases. As a result, the amount of shear deformation shear strain becomes accordingly smaller. The same is true for the elastic body 66.

Thus, as the outside diameters of the radially outer portions of the members 64,66 increase within the space 56, the amount of shear deformation/shear strain of the members 64,66 becomes smaller. It can thus be expected that the durability and useful life of the elastic member 64,66 will be improved compared to those assembled conventionally, as described above.

Figure 5:
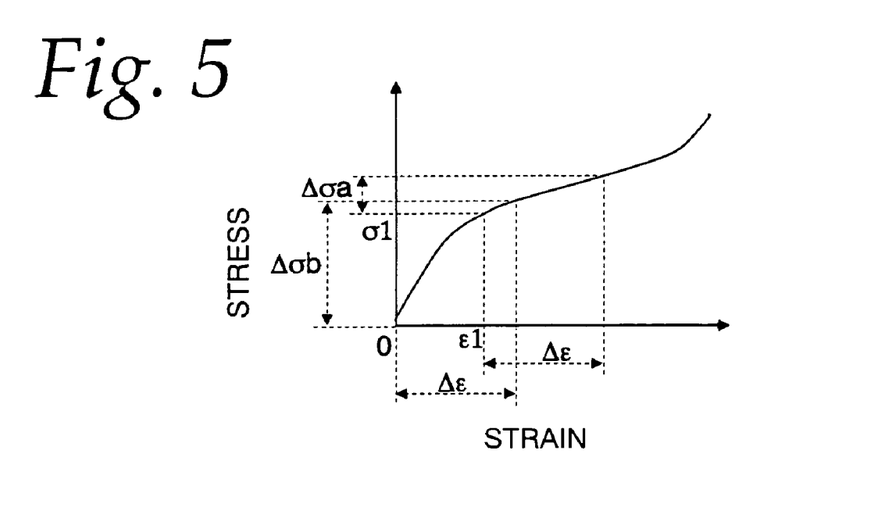
FIG. 5 is a graph showing the relationship between stress and strain for the deformed elastic members on the pulley assembly in FIG. 2.

In FIG. 5, a stress-strain relationship is shown for the elastic members 64,66. As the strain increases, the proportion of stress with respect to a predetermined increment of strain decreases. Therefore, the additional stress $\Delta\sigma a$ obtained with a predetermined additional strain $\Delta\epsilon$, starting from a condition wherein a strain $\epsilon1$ was developed by the action of a stress $\sigma1$, is smaller than an increment $\Delta\sigma b$ obtained when the predetermined strain $\Delta\epsilon$ is developed under a no-load condition.

Each of the elastic members 64,66 is installed within the space 56 in a radially compressed/deformed, state and is subjected to compressive stresses along the radial direction irrespective of whether or not the body 48 rotates relative to the body 54. Thus, when the body 48 rotates relative to the body 54, a shear stress is exerted on the elastic members 64,66 that is smaller than it would be under a no-load condition.

As the body 48 periodically rotates relative to the body 54, a certain magnitude of shearing stress is exerted repeatedly on the elastic members 64,66. By decreasing the magnitude of this repeating, exerted stress, the life of the members 64,66, before fatigue occurs, is expected to be extended. Thus, as compared to the elastic members 64,66 under a no-load condition, the elastic members 64,66 installed under compression will be anticipated to have a longer service life before the elastic members 64,66 fail by fatigue. Durability and life can thus be improved.

To install the elastic members 64,66 in the compressed condition, the radially inside diameters of the elastic members 64,66 may be made slightly smaller than the radially outer diameters of the inner rings 98,100, while the radially outside diameters of the elastic members 64,66 may be equal to or slightly greater than the radially inside diameters of the outer rings 106,108.

In this embodiment, while the elastic members 64,66 are installed in a radially compressed condition, they may be installed in a stretched condition in the radial direction. In that event, the stress/strain relationship shown in FIG. 5 is the same as for the installation in a compressed state. Thus, when the first body 48 rotates relative to the second body 54, the shear stress on the elastic members 64,66 becomes less than that exerted in the event that the elastic members 64,66 are in a no-load condition. The elastic members 64,66 could, however, be installed in the space 56 in a no-load state.

In this embodiment, although the radially outwardly facing surfaces of the elastic members 64,66 are fixed through the outer rings 106,108, respectively to the radially inwardly facing surface 60 on the second body 54 and the radially inwardly facing surface 58 on the first body 48, they may be directly fixed, without requiring the outer rings 106,108, to the radially inwardly facing surfaces 58,60.

Still further, while the radially inwardly facing surfaces of the elastic members 64,66 are fixed through the inner rings 98,100 to the inside ring 114, they may be alternatively directly fixed to the inside ring 114, without requiring the intermediate inner rings 98,100.

Figure 6:
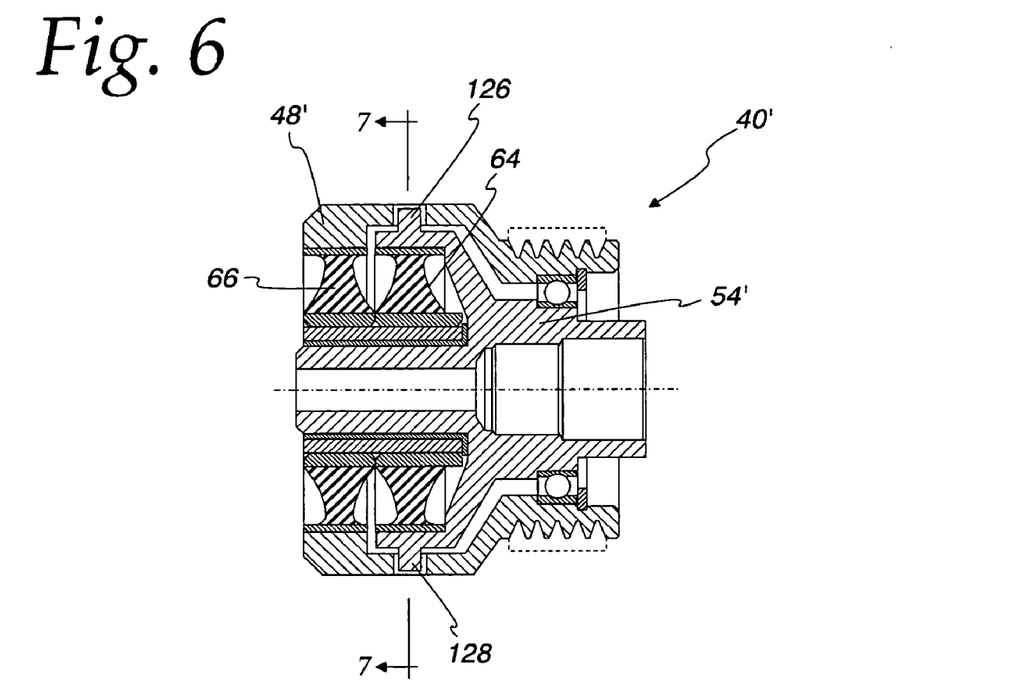
FIG. 6 is a view corresponding to that in FIG. 2 of a modified form of pulley assembly, according to the invention.
Figure 7:
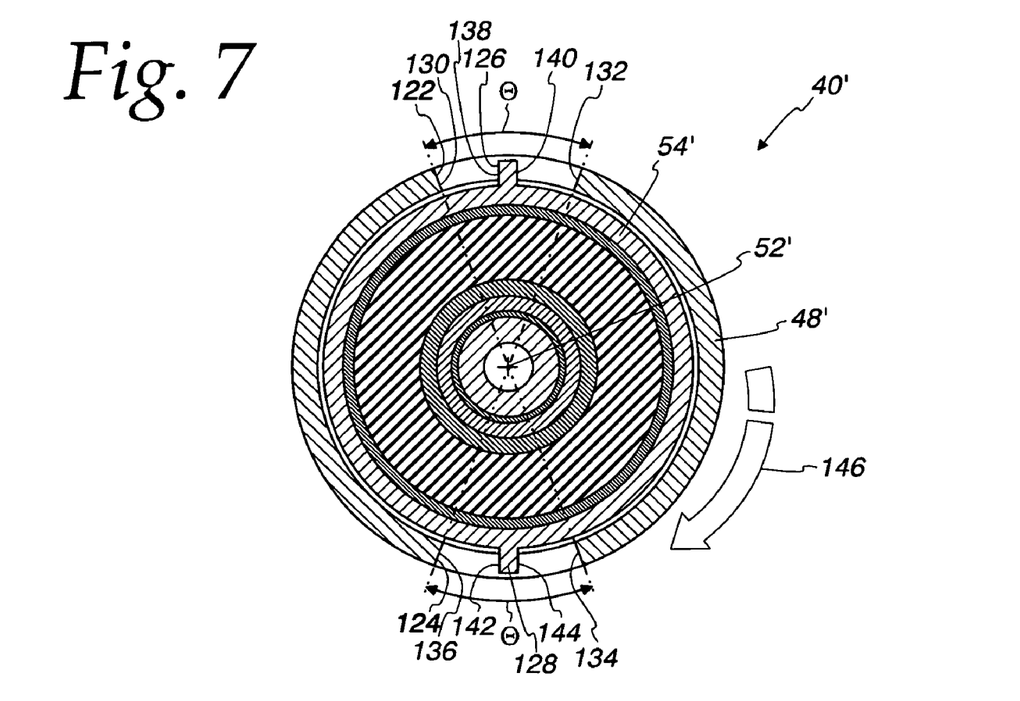
FIG. 7 is a cross-sectional view of the pulley assembly taken along line 7-7 of FIG. 6.

In FIGS. 6 and 7, a modified form of pulley assembly 40' is shown. Identical parts on the pulley assembly 40 and the pulley assembly 40', and other pulley assemblies described hereinbelow, are identified with the same reference numbers. Corresponding, but differently configured, parts are identified with the same reference numbers differentiated by a "'", "''", etc. designation.

The pulley assembly 40' functions substantially the same as the pulley assembly 40 with the exception that the first body 48' is modified to incorporate circumferentially extending slots 122,124, at diametrically opposite locations with respect to the axis 52', with the second body 54' modified to include radial protrusions 126,128 that extend, one each, into the slots 122,124, respectively. The slots 122,124 and protrusions 126,128 define a rotation restricting mechanism that limits relative angular movement between the bodies 48',54' in both directions around the axis 52' to a predetermined displacement angle.

The slot 122 is bounded by circumferentially facing shoulders 130,132, with the slot 124 bounded by circumferentially facing shoulders 134,136. The protrusion 126 has circumferentially oppositely facing shoulders 138,140, with the protrusion 128 having corresponding circumferentially oppositely facing shoulders 142,144.

As the body 54' moves around the axis 52' in the direction of the arrow 146, the shoulder 140 on the protrusion 126 abuts to the shoulder 132 bounding the slot 122. Simultaneously, the shoulder 142 on the protrusion 128 abuts to the shoulder 136 bounding the slot 124. The movement of the second body 54' relative to the first body 48', in a direction opposite to the arrow 146, causes the shoulder 138 on the protrusion 126 to abut to the shoulder 130 bounding the slot 122 simultaneously as the shoulder 144 on the protrusion 128 abuts to the shoulder 134 bounding the slot 124.

Through this arrangement, relative movement between the bodies 48',54' is positively limited within an angular range indicated by the angle $\theta$. The range $\theta$ is selected taking into consideration the construction of the elastic members 64,66 so that the shearing deformation thereof is controlled within the limits of the design and materials. Accordingly, it can be assured that the bodies 48',54' will not move to the point that the elastic members 64,66 are detrimentally deformed in shear.

The interaction of the elastic members 64,66 with each other and the members 48',54' is the same as that depicted in FIG. 1 for the pulley assembly 40.

While the slots 122,124 are shown to be extended fully through their respective bodies 48',54', the invention contemplates that the slots 122, 124 may be formed as undercuts that do not extend fully through. So long as a shoulder is defined to provide an abutment surface, the operation and performance will be the same.

The invention also contemplates that the location of the slots 122,124 and protrusions 126,128 can be reversed. For example, the protrusions may be on the first body 48', with the slots provided on the second body 54'.

Still further, the structure will be operational with but one protrusion and one cooperating slot. Alternatively, more than the two protrusions and cooperating slots shown may be utilized.

Figure 8:
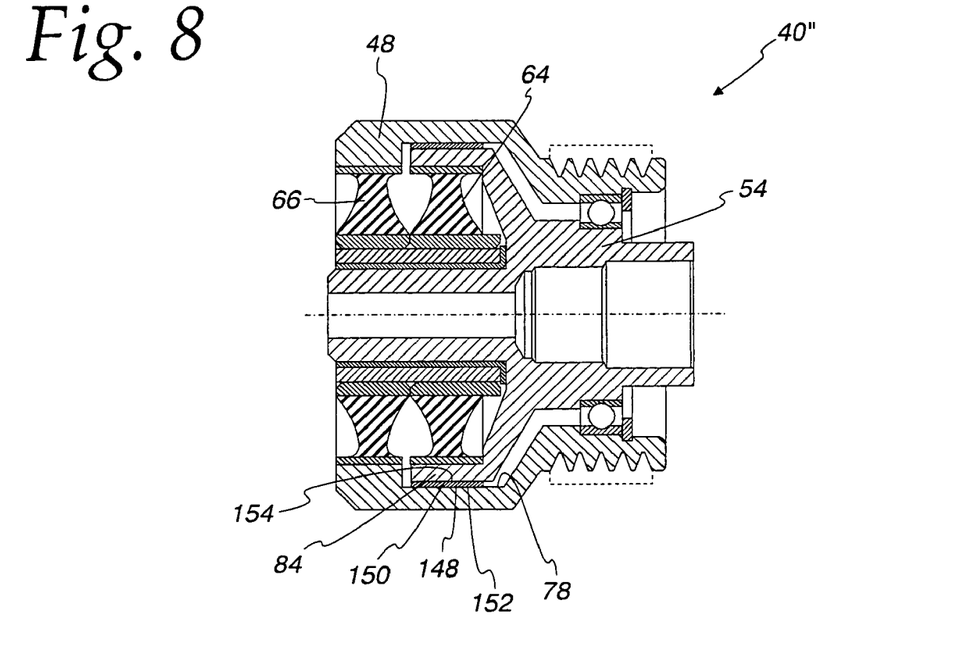
FIG. 8 is a view as in FIG. 2 of a further modified form of pulley assembly, according to the present invention.

In FIG. 8, a pulley assembly 40" is shown, corresponding to the pulley assembly 40 shown in FIG. 2, with one primary difference. The bodies 48,54 have the same configuration as shown on the pulley assembly 40 in FIG. 2 and cooperate in the same manner. However, an annular friction member 148 is interposed between the radially inwardly facing surface 78 on the first body 48 and a radially outwardly facing surface 150 on the outer section 84 of the second body 54.

The friction member 148 can be made from metallic materials, such as brass, bronze, plated brass or plated bronze. Alternatively, the construction may be of a wear resistant synthetic resin, such as nylon, polyacetal, or polyallylate.

The radially outwardly facing surface 152 of the friction member 148 is fixed to the surface 78. The radially inwardly surface 154 on the friction member 148 is guidable slidingly against the outer section 84.

As the bodies 48,54 rotate relative to each other, the friction member 148, rotating with the first body 48, generates a frictional force between the bodies 48,54 that restricts relative movement. Thus, the bodies 48,54 tend to move together in a manner whereby the relative rotational angle is decreased. Accordingly, the amount of shear deformation of the elastic members 64,66 is controlled, thereby potentially extending the durability and life of these members 64,66.

The invention also contemplates that, as an alternative to fixing the friction member 148 to the member 48, the radially inwardly facing surface 154 on the friction member 148 may be fixed to the surface 150 on the outer section 84 of the second body 54. During operation, as relative rotation occurs between the bodies 48,54, the friction member 148 slides guidingly against the first body 48.

While no rotation restricting structure, such as shown in FIGS. 6 and 7, is depicted on the pulley assembly 40", it is contemplated that the various arrangement of slots and protrusions, described with respect to those figures, may be incorporated into the pulley assembly 40".

Figure 9:
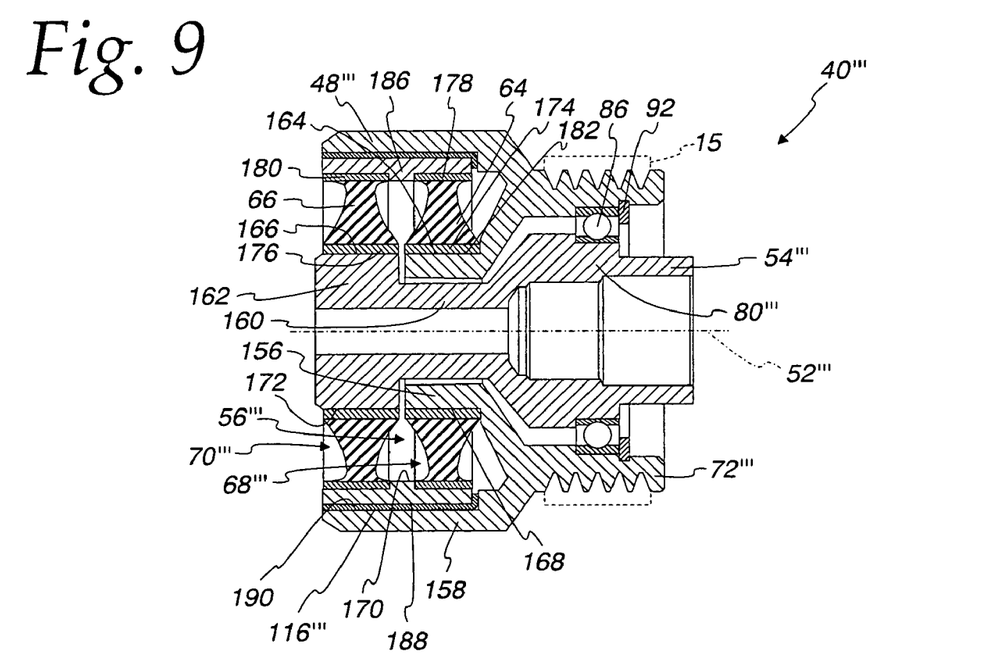
FIG. 9 is a view as in FIG. 2 of a still further modified form of pulley assembly, according to the present invention.

In FIG. 9, a further modified form of pulley assembly is shown at 40'''. They pulley assembly 40''' consists of a first body 48''' and a second body 54''', movable relative to each other around an axis 52'''.

The bodies 48''',54''' have radially inwardly and outwardly facing surfaces that cooperatively bound a space 56''' for first and second elastic members 64,66, that are axially spaced from each other. The belt 15 is extended around a pulley section 72''' on the body 48'''. The bodies 48''',54''' are guided in rotational movement by a roller bearing 86 held in place by a snap ring 92.

The body 48''' has an inner cylindrical section 156 and an outer cylindrical section 158 that branch from the pulley section 72'''. The inner section 156 has a shorter axial extent than the outer section 158. The sections 72''', 156 and 158 are formed together as one piece, though this is not required.

The body 54''' has a main section 80''', radially inside the pulley section 72''', and a center section 160 that continues into an end section 162. The center section 160 has a reduced diameter compared to that of the axially bounding main and end sections 80''', 162. The inner section 156 of the first body 48''' axially coincides with the center section 160 of the second body 54''' and is radially inwardly offset so that the radially outwardly facing surface 164 on the inner section 156 has the same diameter as the radially outwardly facing surface 166 on the end section 162.

The space 56''' is made up of first and second subspaces 68''', 70''', within which the elastic members 64,66 respectively reside. The first subspace 68''' is bounded by a radially outwardly facing surface 168 on the inner section 156 and a radially inwardly facing surface 170, each on the first body 48'''. The second subspace 70''' is bounded by a radially outwardly facing surface 172 on the second body 54''' and the radially inwardly facing surface 170.

The shapes of the elastic members 64,66 on the pulley assembly 40''' correspond to the shapes of the elastic members 64,66 on the pulley assembly 40. The composition of the elastic members 64,66 may also be the same. This is not required, however.

Inner rings 174,176 are fixed at the insides of the elastic members 64,66, respectively. Outer rings 178,180 are fixed to the outside of the elastic members 64,66.

The inner ring 174 is in turn fixed to the outwardly facing surface 182 of the inner section 156. The inner ring 176 is fixed to the radially outwardly facing surface 172 of the end section 162 of the second body 54'''. Thus, the radially inner portions of the elastic members 64,66 are respectively fixed to the first body 48''' and the second body 54''' through the inner rings 174,176.

The outer rings 178,180 are fixed to an outer ring coupling member 186 that is preferably formed of a metallic material. Through this arrangement, the radially outer portions of the elastic members 64,66 are fixed to rotate together around the axis 52'''.

A slide bearing 116''' resides between the radially outwardly facing surface 188 of the coupling member 186 and the radially inwardly facing surface 190 of the outer section 158. The ring coupling member 186 is fixed to the slide bearing 116'''. The ring coupling member 186 is thereby guided smoothly in rotation relative to the first body 48''' with low frictional resistance.

The radially outer portions of the elastic members 64,66 are thus rotatable relative to the first body 48''', being slidably and rotatably disposed on the outer section 158 through the outer rings 178,180 and ring coupling member 186.

The pulley assembly 40''' exhibits the same operating advantages as does the pulley assembly 40, previously described. That is, as the first body 48''' rotates relative to the second body 54''' through an angle θ, the radially inside surface of the elastic member 64 rotates by a corresponding angle θ relative to the radially inside surface of the elastic member 66, connected to the second body 54'''. Since the radially outer surfaces of the elastic members 64,66 are coupled together, they are both deformed by shear in opposite directions through a torsion angle θ/2. Because of this controlled deformation, the advantages described with the pulley assembly 40 are realized as well with this embodiment.

While not shown in FIG. 9, the pulley assembly 40''' may include rotation restricting slots and protrusions as shown in FIGS. 6 and 7 and described above.

Figure 10:
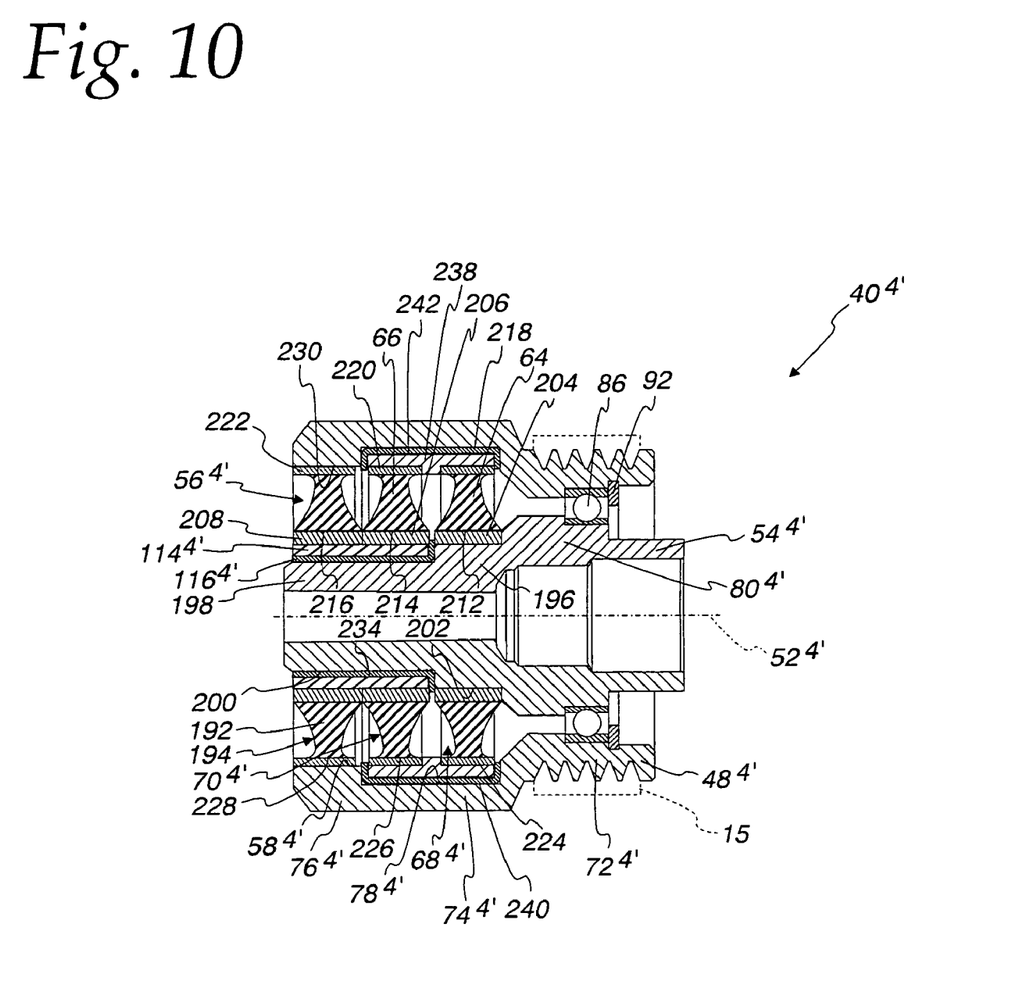
FIG. 10 is a view as in FIG. 2 of yet a further modified form of pulley assembly, according to the invention.

In FIG. 10, a further modified form of pulley assembly is shown at $40^{4'}$. The pulley assembly $40^{4'}$ has a first body $48^{4'}$ and a second body $54^{4'}$ rotatable relative to each other around an axis $52^{4'}$. The bodies $48^{4'},54^{4'}$ are guided in movement relative to each other by a roller bearing 86. A snap ring 92 secures the roller bearing 86 and confines relative axial movement between the bodies $48^{4'},54^{4'}$.

Between radially inwardly and outwardly facing surfaces on the bodies $48^{4'},54^{4'}$, a space $56^{4'}$ is defined within which first, second and third elastic members 64,66,192, respectively, are provided. More particularly, the first, second and third elastic members 64,66,192 are provided in first, second and third subspaces 68$^{4'}$,70$^{4'}$,194, respectively.

The first body 48$^{4'}$ has a pulley section 72$^{4'}$, a center section 74$^{4'}$ and an end section 76$^{4'}$. The belt 15 is wrapped around the pulley section 72$^{4'}$. The radially inwardly facing surface 78$^{4'}$ on the center section 74$^{4'}$ has a smaller diameter than the radially inwardly facing surface 58$^{4'}$ on the end section 76$^{4'}$.

The second body 54$^{4'}$ has a main section 80$^{4'}$, a center section 196 and an end section 198.

The end section 198 has a radially outwardly facing surface 200 that is smaller in diameter than a radially outwardly facing surface 202 on the center section 196.

The elastic members 64,66,192 on the pulley assembly 40$^{4'}$ are all the same as the corresponding elastic members, 64,66 on the pulley assembly 40. The composition of the elastic members 64,66,192 on the pulley assembly 40$^{4'}$ may also be the same as for the elastic members 64,66 on the pulley assembly 40.

Inner rings 204,206,208 are respectively fixed to radially inside surfaces 212,214,216 on the elastic members 64,66, 192.

Outer rings 218,220,222 are respectively fixed to radially outwardly facing surfaces 224,226,228 of the elastic members 64,66,192.

The outer ring 222 is fixed to the radially inwardly facing surface 230 of the end section 76$^{4'}$. The inner ring 204 is fixed to the radially outwardly facing surface 202 on the center section 196.

The inner rings 206,208 are fixed to an inside ring 114$^{4'}$. Through this arrangement, the radially inside portions of the elastic members 66,192 are coupled together to move together around the axis 52$^{4'}$.

A slide bearing 116$^{4'}$ is interposed between the inside ring 114$^{4'}$ and surface 200 on the end section 198. The radially inwardly facing surface 234 of the inside ring 114$^{4'}$ is fixed to the slide bearing 116$^{4'}$. With this arrangement, the radially inner portions of the elastic members 66,192 are rotatable together relative to the second body 54$^{4'}$ while being slidably disposed on the end section 198 through the inner rings 206, 208 and the inside ring 114$^{4'}$.

The outer rings 218,220, attached to the radially outer portions of the elastic members 64,66, are fixed to an outer ring coupler 238. Accordingly, radially outer portions of the elastic members 64,66 are coupled together to rotate around the axis 52$^{4'}$.

A cylindrically-shaped slide bearing 240 is mounted on the radially outwardly facing surface 242 of the outer ring coupler 238. Accordingly, the radially outer portions of the elastic members 64,66 are guidingly rotatable together relative to the first body 48$^{4'}$, while being slidably and rotatably disposed on the center section 74$^{4'}$ of the first body 48$^{4'}$, through the outer rings 218,220 and the outer ring coupler 238.

With the structure described above, the radially outer portions of the elastic members 66,192 are connected respectively to the second and first bodies 54$^{4'}$, 48$^{4'}$. More specifically, the radially outer portion of the elastic member 192 is fixedly connected through the outer ring 222 to the first body 48$^{4'}$. The radially outer portion of the elastic member 66 is connected to the second body 54$^{4'}$ through the outer ring 220, the outer ring coupler 238, the elastic member 64, and the inner ring 204.

The radially inner portions of the elastic members 64,66 are respectively connected to the second and first bodies 54$^{4'}$,48$^{4'}$. More specifically, the radially inner portion of the elastic member 66 is connected through the inner ring 206, the inside ring 114$^{4'}$, the inner ring 208, the elastic member 192, and the outer ring 222 to the first body 48$^{4'}$. The radially inner portion of the elastic member 64 is fixed to the second body 54$^{4'}$ through the inner ring 204.

As with the embodiment in FIG. 9, when the first body 48$^{4'}$ rotates relative to the second body 54$^{4'}$ by an angle θ, the radially outer surface of the elastic member 192, fixed to the first body 48$^{4'}$, rotates relative to the radially inside surface of the elastic member 64, that is fixed to the second body 54$^{4'}$, by the same angle θ. The radially outer portion of the elastic member 192, fixed to the first body 48$^{4'}$, rotates relative to the radially outer portion of the elastic member 66, connected to the second body 54$^{4'}$. Since the radially inner portions of the elastic members 66,192 are coupled together, the two elastic members 66,192 are deformed in shear in opposite directions to an extent equal to the relative rotational angle between the radially outwardly facing surfaces divided by two.

The radially inner portion of the elastic member 66, connected to the first body 48$^{4'}$, rotates relative to the radially inner portion of the elastic member 64 that is fixed to the second body 54$^{4'}$. Since the radially outer portions of the elastic members 64,66 are coupled together, the elastic members 64,66 are deformed in shear in an opposite direction to an extent equal to the relative rotational angle between the radially inwardly facing surface divided by two.

The elastic members 64,66,192 are thus deformed in shear to accommodate variations in rotation between the bodies 48$^{4'}$,54$^{4'}$. Since the relative rotational angle between the radially outer portion of the elastic member 192, fixed to the first body 48$^{4'}$, and the radially inner portion of the elastic member 64, fixed to the second body 54$^{4'}$, is equal to the angle θ, each torsion angle for the elastic members 64,66,192 becomes θ/3. This is significantly smaller than if there was a direct connection between the bodies 48$^{4'}$,54$^{4'}$ through a single elastic member. Accordingly, the durability and life of the elastic members 64,66,192 can be extended.

While not shown, the pulley assembly 40$^{4'}$ may incorporate a rotation restricting structure, such as the protrusions and slots shown in FIGS. 6 and 7.

It should be understood that the number of elastic members is not limited to the two or three shown. Four or more such elastic members may be incorporated.

Further, while the pulley assemblies have been shown used in association with an alternator shaft 18, the pulley assemblies could be incorporated into any of the auxiliary apparatus, notably the air compressor 20, power steering unit 24, water pump 28, etc. As a further alternative, the pulley assemblies could be provided on the engine output/crank shaft 12.

While each of the elastic members is shown to extend fully around the central axes of the pulley assemblies, and this form is preferred, the elastic members could extend only partially therearound. Each elastic member could likewise be made from multiple segments.

The foregoing disclosure of specific embodiments is intended to be illustrative of the broad concepts comprehended by the invention.

The invention claimed is:

1. A pulley assembly comprising:
   a first body having a cylindrically-shaped surface to engage a power transmission belt,
   the first body rotatable around a first axis,
   a second body in axially overlapping relationship with the first body,
   the second body movable relative to the first body around the first axis; and
   a plurality of elastic members, including at least first and second axially spaced elastic members, each extending at least partially around the first axis, the first and second elastic members each having a radially inner portion and a radially outer portion, wherein one of: (a) the radially inner portions of the first and second elastic members; and (b) the radially outer portions of the first and second elastic members are: (i) coupled to move together around the first axis; and (ii) each movable relative to the first and second bodies around the first axis, wherein the other of: (a) the radially inner portions of the first and second elastic members; and (b) the radially outer portions of the first and second elastic members are fixedly coupled one each to the first and second bodies so as to follow movement of the first and second bodies around the first axis.

2. The pulley assembly according to claim 1 wherein the first and second bodies define a space bounded by radially oppositely facing surfaces within which the first and second elastic members reside.

3. The pulley assembly according to claim 2 wherein the first and second elastic members are each annular in shape.

4. The pulley assembly according to claim 3 wherein the first and second elastic members are made from rubber.

5. The pulley assembly according to claim 3 wherein at least part of the second body resides radially within the first body.

6. The pulley assembly according to claim 5 wherein the second body comprises radially inner and outer axially overlapping cylindrical sections each with an axial extent, the radially outer section having a shorter axial extent than the radially inner section, the space comprises a first subspace and a second subspace, the first subspace bounded by a radially inwardly facing surface on the first body and a radially outwardly facing surface on the radially inner section, the second subspace bounded by a radially inwardly facing surface on the radially outer section and a radially outwardly facing surface on the radially inner section, the first and second elastic members residing respectively in the first and second subspaces, the radially inner portions of the first and second elastic members coupled to move together around the first axis, the radially outer portion of the first elastic member is fixedly coupled to the radially inwardly facing surface on the first body, and the radial outer portion of the second elastic member is fixedly coupled to the radially inwardly facing surface on the radially outer section.

7. The pulley assembly according to claim 1 wherein the one of: (a) the radially inner portions of the first and second elastic members; and (b) the radially outer portions of the first and second elastic members are slidably attached to one of the first and second bodies.

8. The pulley assembly according to claim 5 wherein the one of: (a) the radially inner portions of the first and second elastic members; and (b) the radially outer portions of the first and second elastic members are slidably attached to the first body.

9. The pulley assembly according to claim 1 wherein at least one of the elastic members is installed to be in a radially compressed or a radially extended state.

10. The pulley assembly according to claim 8 wherein at least one of the elastic members is installed to be in a radially compressed or a radially extended state.

11. The pulley assembly according to claim 1 wherein there is a first shoulder on the first body and a second shoulder on the second body, the first and second shoulders abutting to block relative movement of the first and second bodies around the first axis.

12. The pulley assembly according to claim 5 wherein there is a first shoulder on the first body and a second shoulder on the second body, the first and second shoulders abutting to block relative movement of the first and second bodies around the first axis.

13. The pulley assembly according to claim 10 wherein there is a first shoulder on the first body and a second shoulder on the second body, the first and second shoulders abutting to block relative movement of the first and second bodies around the first axis.

14. The pulley assembly according to claim 11 wherein there is a circumferentially extending slot in one of the first and second bodies bounded by one of the first and second shoulders and there is a protrusion on the other of the first and second bodies that extends into the slot and defines the other of the first and second shoulders.

15. The pulley assembly according to claim 12 wherein there is a circumferentially extending slot in one of the first and second bodies bounded by one of the first and second shoulders and there is a protrusion on the other of the first and second bodies that extends into the slot and defines the other of the first and second shoulders.

16. The pulley assembly according to claim 13 wherein there is a circumferentially extending slot in one of the first and second bodies bounded by one of the first and second shoulders and there is a protrusion on the other of the first and second bodies that extends into the slot and defines the other of the first and second shoulders.

17. The pulley assembly according to claim 1 wherein the pulley assembly further comprises a friction member that contacts the first and second bodies and generates a frictional force between the first and second bodies.

18. The pulley assembly according to claim 5 wherein the pulley assembly further comprises a friction member that contacts the first and second bodies and generates a frictional force on both the first and second bodies.

19. The pulley assembly according to claim 10 wherein the pulley assembly further comprises a friction member that contacts the first and second bodies and generates a frictional force between the first and second bodies.

20. The pulley assembly according to claim 1 in combination with: an engine having an output shaft and a first pulley mounted to the output shaft; a plurality of auxiliary apparatus comprising an alternator and at least one other auxiliary apparatus, each auxiliary apparatus having a shaft, the alternator having a shaft with the pulley assembly thereon, the at least one other auxiliary apparatus having a pulley on its associated shaft; and a belt trained around the first pulley, the pulley assembly and the pulley on the at least one other auxiliary apparatus.

21. The pulley assembly according to claim 1 wherein the first and second axially spaced elastic members do not axially overlap each other along the first axis.

22. The pulley assembly according to claim 9 wherein the at least one of the elastic members is radially compressed by and between facing surfaces upon being installed.

23. The pulley assembly according to claim 1 wherein each of the first and second elastic members has a radial extent and the radial extent of the first and second elastic elements is substantially the same.

24. The pulley assembly according to claim 1 wherein the radially inner portions of the first and second elastic members have radially inwardly facing surfaces that are substantially concentric.

25. The pulley assembly according to claim 1 wherein the radially outer portions of the first and second elastic members have radially outwardly facing surfaces that are substantially concentric.

* * * * *